(No Model.) 2 Sheets—Sheet 1.
H. A. GREEN.
KITCHEN CABINET.
No. 513,010. Patented Jan. 16, 1894.
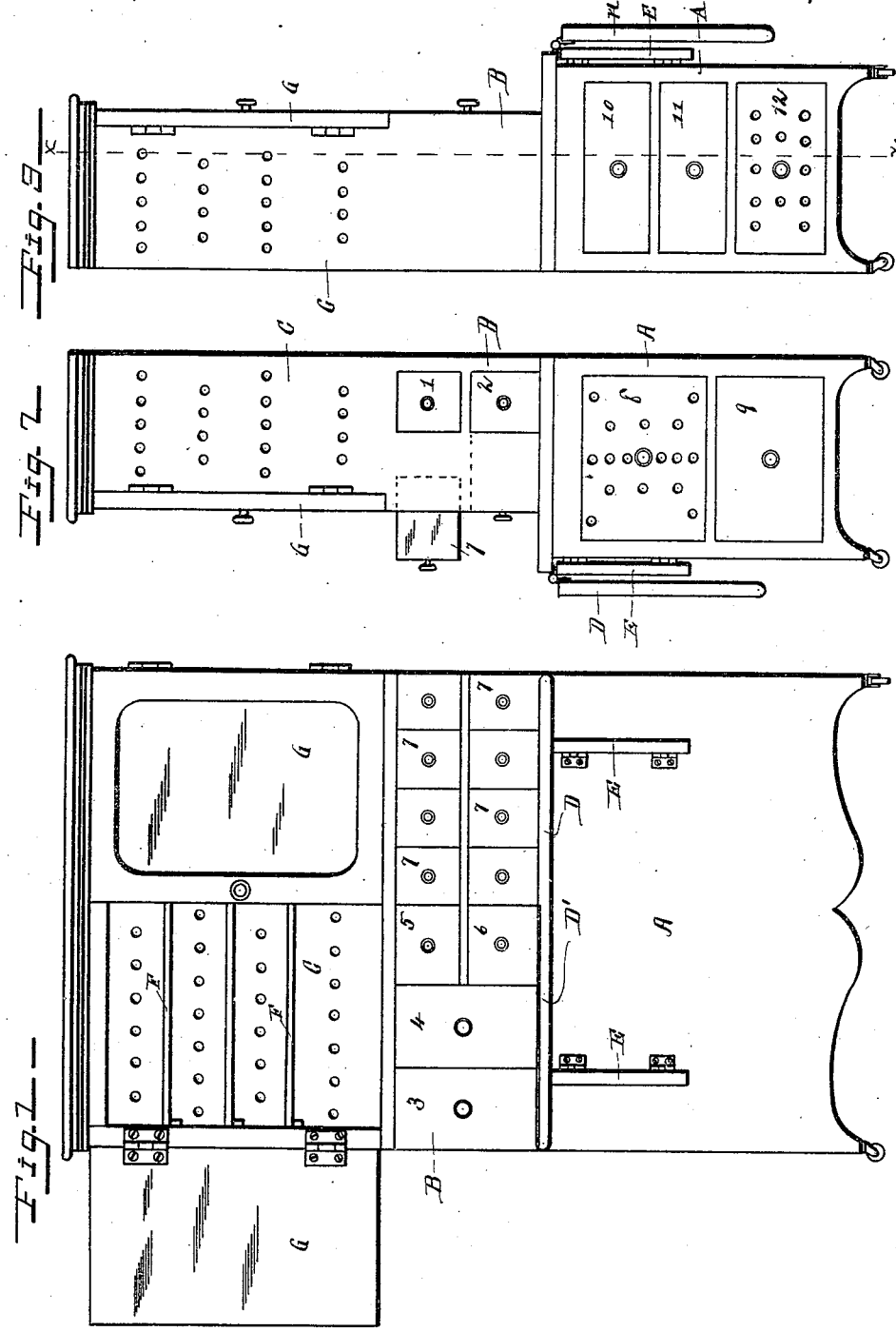
WITNESSES
Geo. M. Anderson
Phill C. Masi.
INVENTOR
Hannah A. Green
by E. W. Anderson
her Attorney
THE NATIONAL LITHOGRAPHING COMPANY,
WASHINGTON, D. C.

(No Model.) 2 Sheets—Sheet 2.
H. A. GREEN.
KITCHEN CABINET.
No. 513,010. Patented Jan. 16, 1894.
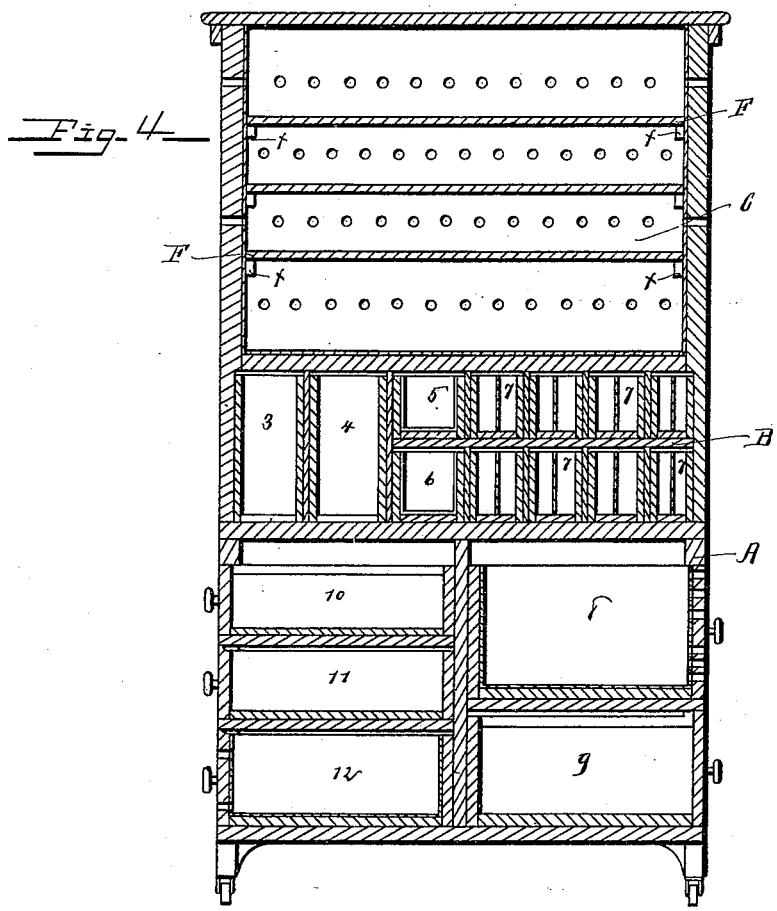
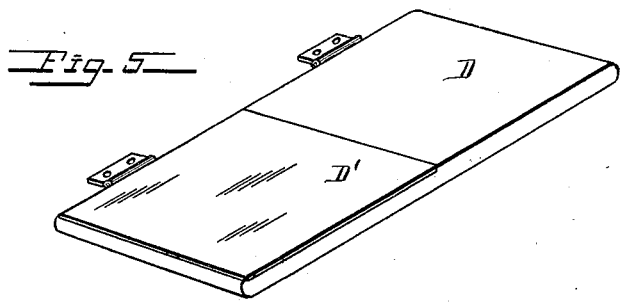
WITNESSES
Geo. M. Anderson
Phil C. Masi
INVENTOR
Hannah A. Green
by E. W. Anderson
her Attorney
THE NATIONAL LITHOGRAPHING COMPANY,
WASHINGTON, D. C.

UNITED STATES PATENT OFFICE.

HANNAH A. GREEN, OF WOMER, KANSAS.

KITCHEN-CABINET.

SPECIFICATION forming part of Letters Patent No. 513,010, dated January 16, 1894.

Application filed August 31, 1893. Serial No. 484,473. (No model.)

*To all whom it may concern:*

Be it known that I, HANNAH A. GREEN, a citizen of the United States, and a resident of Womer, in the county of Smith and State of Kansas, have invented certain new and useful Improvements in Kitchen-Cabinets; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a front view of the cabinet partly open. Fig. 2 is a view of one side with a drawer open. Fig. 3 is a view of the opposite side. Fig. 4 is a vertical longitudinal section taken on line $x\ x$ of Fig. 3 and Fig. 5 is a detail view in perspective of the baking table.

This invention has relation to certain new and useful improvements in kitchen cabinets, the object being to provide a convenient and portable article of furniture of this character, comprising a hot-food closet, molding board, and a series of drawers for various articles and utensils used in cooking, baking, &c.; and the invention consists in the novel construction and combination of parts, all as hereinafter described and pointed out in the claims.

In the accompanying drawings, the letter A designates the base portion of the cabinet, B a case of drawers, supported on said base, and C, the hot-food closet above said drawers.

D designates the molding board, which is hinged at its rear edge to the upper forward portion of the base of the cabinet, and is adapted when not in use to fold downwardly against the forward portion of the said base. Said board is supported in upright position by means of two swinging brackets E, E, which are arranged to fold inwardly against the base when not in use. The left hand portion D' of the board is covered with zinc, for the purposes of a molding board. The back and end portions of the hot-food closet C are lined with zinc throughout, said zinc lining, together with the back and sides, being perforated to permit the escape of the steam from the food as it is taken hot from the stove or oven, and placed therein.

F designates the shelves in said closet, said shelves being preferably of hard wood, and supported by cleats *f*, from which they may be readily removed. The closet *c*, and case of drawers B, may if desired be made removable from the base portion A for greater convenience in shipping. The front portion of the closet is formed by the swinging doors G.

In the right hand end of the cabinet, just under the closet, are two long narrow drawers 1 and 2, being designed to contain the rolling pin, cake cutter, and the various utensils employed in cooking and baking.

At the left hand side of the case of drawers, are two large drawers, 3 and 4, side by side and designed to receive oatmeal, prepared flour, dried fruit, &c. Said drawers 3 and 4, extend across the entire depth of the cabinet. To the right of the drawers 3 and 4 and arranged one above the other, are zinc-lined drawers 5 and 6, which also extend to the back of the cabinet, and are designed to contain salt and coffee, or similar articles. The right hand portion of the case of drawers is made up of eight small drawers, 7, arranged in two rows, one row above the other. The drawers are designed to have each two compartments, and are to contain, tea, soda, baking powder, spices, &c. These drawers 7 only extend back to the drawers 1 and 2.

At the right hand end portion of the cabinet, underneath the drawers 1 and 2, are two drawers 8 and 9, one above the other. The drawer 8 is zinc-lined, with a perforated front portion, and is designed for a bread and cake drawer. The drawer 9 has two comparments, and is intended as a receptacle for table cloths, napkins, &c.

In the left hand end of the cabinet, are three drawers, 10, 11, and 12. Drawer No. 10, has two compartments, and is designed to receive towels, while the drawers 11 and 12, are for sugar and cake. The drawer 12 is zinc lined, and perforated.

The cabinet is supported upon casters, and is designed to be sufficiently light to enable it to be rolled up to a position near the stove, in baking and cooking.

Having thus described my invention, what I claim as new, and desire to secure by Letters Patent, is—

1. An improved kitchen cabinet, comprising the base portion A, having the end drawers 8, 9, 10, 11 and 12, the drawers 8 and 12 having zinc linings, and perforated at their outer portions, the case of drawers above said base portion, the long narrow end drawers 1 and 2, behind said case of drawers, the closet above said case of drawers, said closet having a perforated back and sides, and zinc lined, and the folding molding board having a zinc-covered portion, and the folding brackets for supporting said baking board, substantially as specified.

2. An improved kitchen cabinet, consisting of a base portion A, having the drawers 8, 9, 10, 11, and 12, extending in from the ends of said base portion, the drawers 8 and 11 being zinc lined, and formed with perforations in their outer ends, the case of drawers supported upon said base and opening from the front, the long narrow end drawers opening at one end of the cabinet and seated behind several of the drawers of the case, the hot food closet above the case of drawers, said closet having the swinging doors C at the front, and its sides and ends zinc-lined and perforated, a molding board in front of and below the case of drawers, one end portion of said board having a metallic covering, and folding brackets arranged to support said board, substantially as specified.

In testimony whereof I affix my signature in presence of two witnesses.

HANNAH A. GREEN.

Witnesses:
JOHN BENNETT,
D. A. GROAT.